(12) United States Patent
Chuang

(10) Patent No.: US 6,859,363 B1
(45) Date of Patent: Feb. 22, 2005

(54) SHOCK ABSORBING MECHANISM FOR HARD DISK

(75) Inventor: Yung-Shun Chuang, Hsin-Tien (TW)

(73) Assignee: Aaeon Technology Inc., Taipei (TW)

( * ) Notice: Subject to any disclaimer, the term of this patent is extended or adjusted under 35 U.S.C. 154(b) by 0 days.

(21) Appl. No.: 10/687,802

(22) Filed: Oct. 20, 2003

(51) Int. Cl.⁷ .............................. G06F 01/16
(52) U.S. Cl. ............ 361/685; 361/686; 248/634; 248/636; 248/638
(58) Field of Search .................... 361/685, 686, 361/683; 312/332.1, 333; 248/633, 634, 636, 638, 618; 369/75.1, 75.2, 76, 77.1, 77.2, 78, 79, 80–82

(56) References Cited

U.S. PATENT DOCUMENTS 5,463,527 A * 10/1995 Hager et al. ............... 361/685
5,587,879 A * 12/1996 Spano et al. ............... 361/685
6,751,093 B1 * 6/2004 Hsu et al. ................... 361/685

* cited by examiner

Primary Examiner—Gregory Thompson
Assistant Examiner—Anthony Q. Edwards
(74) Attorney, Agent, or Firm—Rabin & Berdo, P.C.

(57) ABSTRACT

A shock absorbing mechanism for the hard disk is provided. The mechanism comprises a hard disk frame including, at either side, two first holes, two second holes, and two first apertures; two side brackets each including, at an outer side, two slots and two second apertures; two pairs of barbell shaped pads, each pad including two end enlargements and an intermediate neck disposed in the slot; two elongate, inner positioning members each including two end stop members for fastening the inner enlargements, and two third apertures; and two elongate, outer positioning member each including two end positioning members for fastening the outer enlargements in the second hole, and two fourth apertures. The outer positioning members, the frame, the brackets, the inner positioning members, and the hard disk are threadedly secured together.

6 Claims, 3 Drawing Sheets

US 6,859,363 B1

SHOCK ABSORBING MECHANISM FOR HARD DISK

BACKGROUND OF THE INVENTION

1. Field of the Invention

The present invention relates to shockproof hard disks and more particularly to the hard disk of an industrial computer having an improved shock absorbing mechanism.

2. Description of Related Art

It is known that an industrial computer is operated in a strong shock environment. Hence, a useful time of the hard disk of the industrial computer will be shortened significantly if its shock absorbing capability is insufficient. A hard disk of the industrial computer having a well known shock absorbing mechanism is shown in FIG. 1. The shock absorbing mechanism is a suspension type. The shockproof hard disk assembly comprises an inner frame A for receiving a hard disk 1, an outer frame B coupled to the computer case, and a pad 3 filled out between the frames A and B. By configuring as above, strength of shock, jarring or the like generated by a running industrial computer and transmitted to the hard disk 1 will be greatly reduced. However, the prior art suffered from a disadvantage. For example, the provision of the inner and outer frames A and B will greatly reduce available interior space of the computer. Thus, the need for improvement still exists.

SUMMARY OF THE INVENTION

It is an object of the present invention to provide a compact shock absorbing mechanism for a hard disk of a computer, comprising a parallelepiped frame having a forward opening for permitting the hard disk to insert into, the frame including, at either side, two first holes, two second holes between the first holes, and two first apertures between the second holes; two side brackets of a section of substantially n, each bracket being threadedly secured to the hard disk and including, at an outer side, two spaced indentations aligned with the first holes, two vertical, elongate slots between the indentations, and two second apertures between the slots; two pairs of barbell shaped pads, each of the pads including two enlargements at ends and an intermediate neck disposed in the slot; two elongate, inner positioning members each including two end stop members each for fastening the inner enlargement of the pad, and two third apertures between the stop members; two elongate, outer positioning member each including two end positioning members each for fastening the outer enlargement of the pad disposed in the second hole, and two fourth apertures between the positioning members; and a plurality of fasteners driven through the fourth, the first, and the second apertures into the third apertures for fastening the outer positioning members, the frame, the brackets, and the inner positioning members together.

The above and other objects, features and advantages of the present invention will become apparent from the following detailed description taken with the accompanying drawings.

DETAILED DESCRIPTION OF THE PREFERRED EMBODIMENTS

Figure 1:
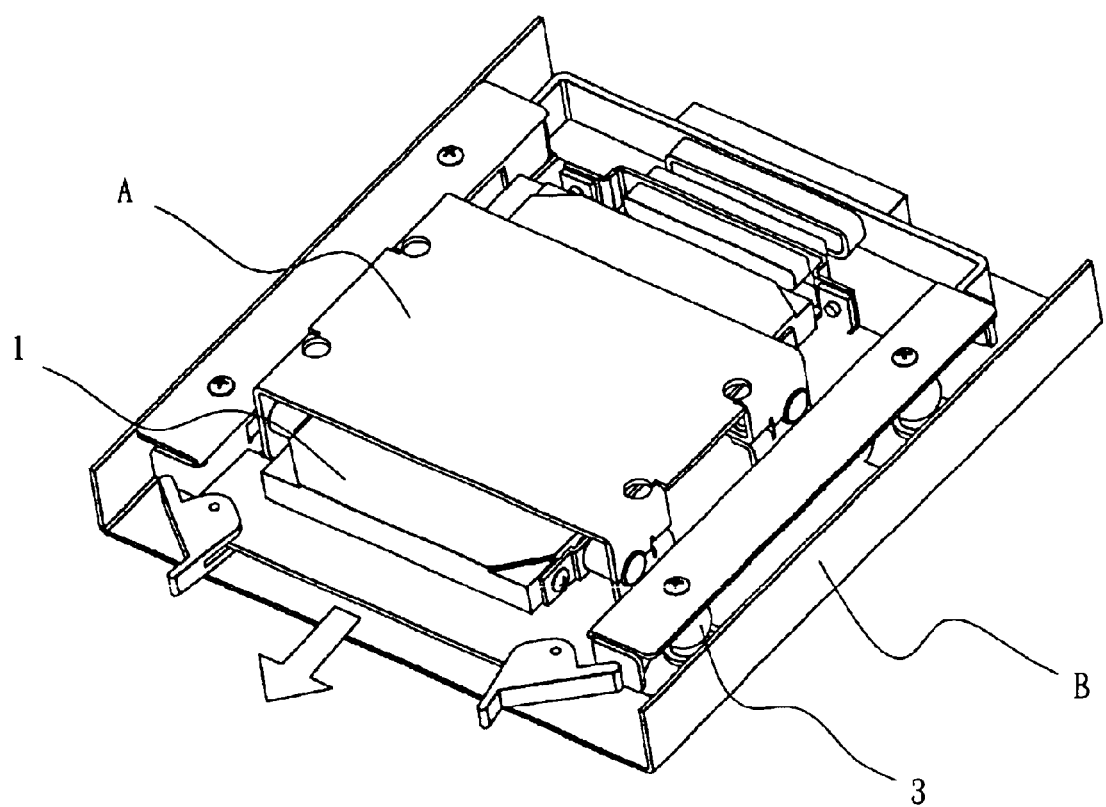
FIG. 1 is a perspective view of a hard disk having a conventional shock absorbing mechanism.
Figure 2:
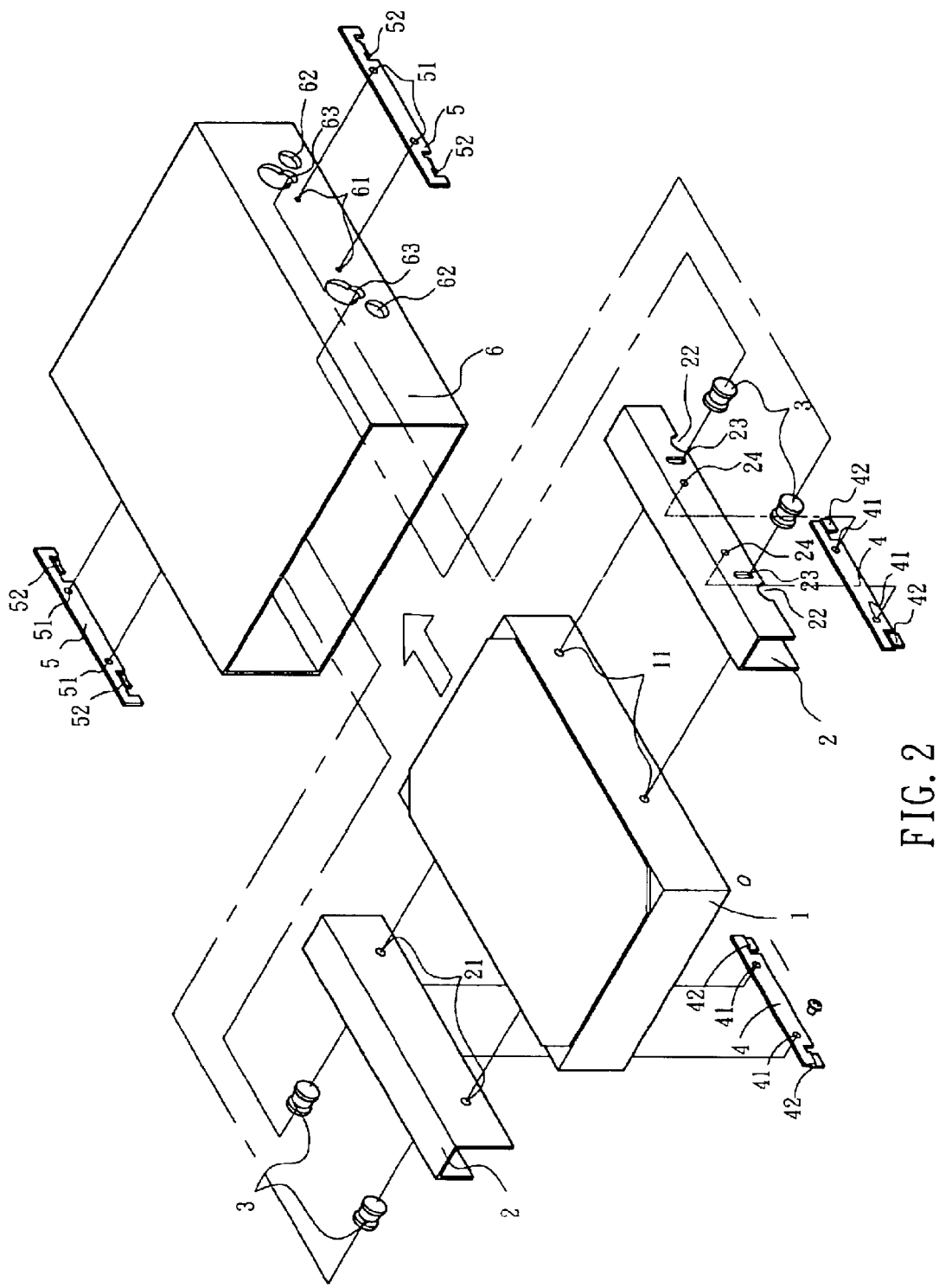
FIG. 2 is an exploded view of a hard disk incorporating a compact shock absorbing mechanism according to the invention.
Figure 3:
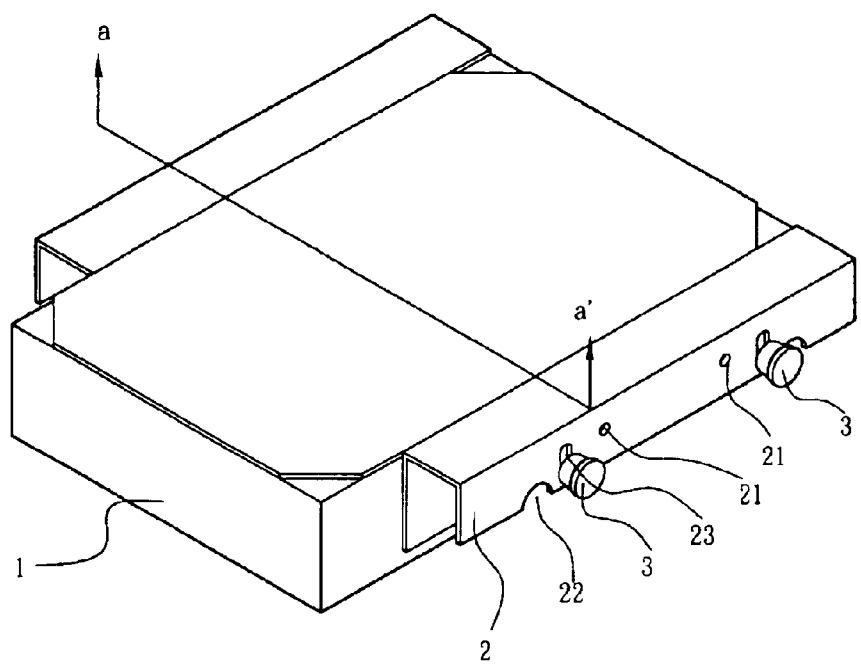
FIG. 3 is an assembled view of the hard disk assembly with the frame removed.
Figure 4:
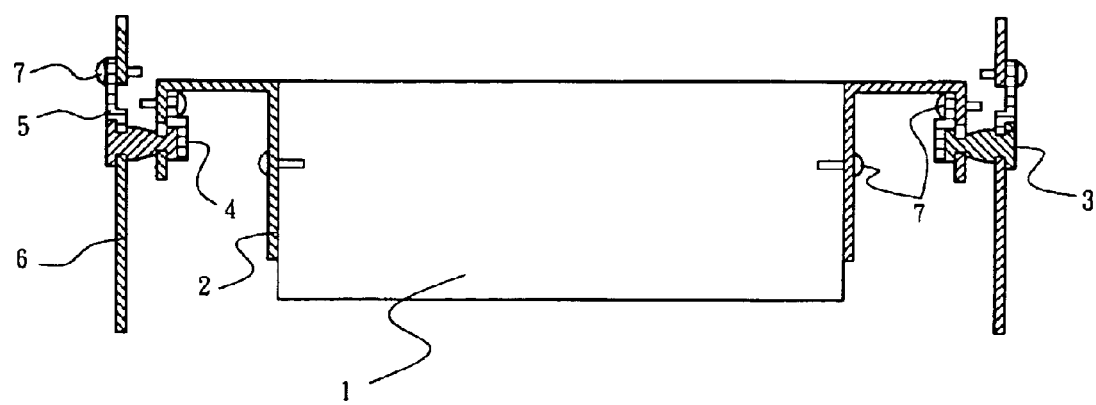
FIG. 4 is a cross-sectional view taken along line a—a of FIG. 3.

Referring to FIGS. 2, 3, and 4, there is shown a compact shockproof hard disk assembly constructed in accordance with the invention. The shockproof hard disk assembly comprises a 3.5" hard disk 1 having two apertures 11 at either side, and a parallelepiped frame 6 having a forward opening for permitting the hard disk 1 to insert into, the frame 6 including, at either side, two spaced, circular holes 62, two inverted teardrop shaped holes 63 between the holes 62, and two apertures 61 between the holes 63. The shockproof hard disk assembly further comprises, at its either side, a metal bracket 2 having a section of substantially n, the bracket 2 including two spaced apertures 21 at an inner side, two spaced indentations 22 at an outer bottom edge, the indentations 22 being aligned with the holes 62 so as to facilitate the bracket 2 to secure to the hard disk 1, two vertical, elongate slots 23 between the indentations 22, and two apertures 24 between the slots 23; two barbell shaped pads 3 each having two enlargements at ends and an intermediate neck disposed in the slot 23; an elongate, inner positioning member 4 including two end stop members 42 each for fastening the inner enlargement of the pad 3, and two apertures 41 between the stop members 42; an elongate, outer positioning member 5 including two end positioning members 52 each for fastening the outer enlargement of the pad 3 disposed in the hole 63, and two apertures 51 between the positioning members 52; and two sets of a plurality of fasteners (e.g., screws) 7 in which one inner set of the fasteners 7 are driven through the apertures 21 into the apertures 11 for fastening the bracket 2 and the hard disk 1 together, and the other outer set of the fasteners 7 are driven through the apertures 51, 61, and 24 into the apertures 41 for fastening the outer positioning member 5, the frame 6, the bracket 2, and the inner positioning member 4 together.

Note that the assembly of the invention can be done by either of two procedures as below. The first procedure comprises assembling the brackets 2, the pads 3, the inner positioning members 4, the outer positioning members 5, and the frame 6 together, and fastening the hard disk 1 and the brackets together by means of the fasteners 7 in response to aligning the holes 62 with the indentations 22. The second procedure comprises assembling the hard disk 1, the brackets 2, the inner positioning members 4, the pads 3, and the frame 6 together, and assembling the outer positioning members 5 and the pads 3 at the holes 63 of the frame 6.

While the invention herein disclosed has been described by means of specific embodiments, numerous modifications and variations could be made thereto by those skilled in the art without departing from the scope and spirit of the invention set forth in the claims.

What is claimed is:

1. A shock absorbing mechanism for a hard disk of a computer, comprising:

a parallelepiped frame having a forward opening for permitting the hard disk to insert into, the frame including, at either side, two first holes, two second holes between the first holes, and two first apertures between the second holes;

two side brackets of a section of substantially n-shape each bracket being threadedly secured to the hard disk and including, at an outer side, two spaced indentations aligned with the first holes, two vertical, elongate slots between the indentations, and two second apertures between the slots;

two pairs of barbell shaped pads, each of the pads including two enlargements at ends and an intermediate neck disposed in the slot:

two elongate, inner positioning members each including two end stop members each for fastening the inner enlargement of the pad, and two third apertures between the stop members;

two elongate, outer positioning member each including two end positioning members each for fastening the outer enlargement of the pad disposed in the second hole, and two fourth apertures between the positioning members; and a plurality of fasteners driven through the fourth, the first, and the second apertures into the third apertures for fastening the outer positioning members, the frame, the brackets, and the inner positioning members together.

2. The shock absorbing mechanism of claim 1, wherein the brackets, the pads, the inner positioning members, the outer positioning members, and the frame are assembled together firstly, and the hard disk and the brackets are threadedly secured together secondly in response to aligning the first holes with the indentations.

3. The shock absorbing mechanism of claim 1, wherein the hard disk, the brackets, the inner positioning members, the pads, and the frame are assembled together firstly, and the outer positioning members and the pads are assembled at the second holes secondly.

4. The shock absorbing mechanism of claim 1, wherein the first holes are circular.

5. The shock absorbing mechanism of claim 1, wherein the second holes: are of inverted teardrop shape.

6. The shock absorbing mechanism of claim 1, wherein the fasteners are screws.

* * * * *